(12) United States Patent
Wagner et al.

(10) Patent No.: US 10,240,654 B2
(45) Date of Patent: Mar. 26, 2019

(54) HYBRID SPRING DEVICE

(71) Applicant: MUBEA CARBO TECH GMBH, Salzburg (AT)

(72) Inventors: Karl Wagner, Salzburg (AT); Georg Ruzicka, Puch bei Hallein (AT); Sebastian Schmitz, Salzburg (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 0 days.

(21) Appl. No.: 14/782,233

(22) PCT Filed: Mar. 28, 2014

(86) PCT No.: PCT/EP2014/056338
§ 371 (c)(1),
(2) Date: Oct. 2, 2015

(87) PCT Pub. No.: WO2014/161791
PCT Pub. Date: Oct. 9, 2014

(65) Prior Publication Data
US 2016/0025173 A1    Jan. 28, 2016

(30) Foreign Application Priority Data
Apr. 3, 2013    (CH) .................................... 00708/13

(51) Int. Cl.
*F16F 1/366*    (2006.01)
*F16F 3/12*    (2006.01)

(52) U.S. Cl.
CPC ............... *F16F 3/12* (2013.01); *F16F 1/366* (2013.01); *F16F 2224/02* (2013.01);
(Continued)

(58) Field of Classification Search
CPC .. F16F 1/021; F16F 1/024; F16F 1/366; F16F 3/12; F16F 3/093; F16F 2224/02;
(Continued)

(56) References Cited

U.S. PATENT DOCUMENTS 1,914,083 A * 6/1933 Eaton ........................ C23C 8/00
                                                            267/166
3,869,113 A    3/1975 Dudek
(Continued)

FOREIGN PATENT DOCUMENTS

DE         17 77 120 U    11/1958
EP         0 101 235 A2   2/1984
(Continued)

OTHER PUBLICATIONS

Translation of DE 1777120.*

*Primary Examiner* — Thomas W Irvin
(74) *Attorney, Agent, or Firm* — Pauley Erickson & Kottis

(57) ABSTRACT

The invention is directed to a hybrid spring device comprising an outer tubular shell, and an inner part enclosed in the outer tubular shell comprising a fiber reinforced plastic material. According to the invention the outer tubular shell is designed as self-supporting part made from a metallic material. The invention further provides suitable methods for producing such types of hybrid spring devices.

16 Claims, 2 Drawing Sheets

(52) U.S. Cl.
CPC ... *F16F 2224/0241* (2013.01); *F16F 2226/04* (2013.01); *F16F 2234/02* (2013.01); *F16F 2238/024* (2013.01); *F16F 2238/026* (2013.01)

(58) Field of Classification Search
CPC ........... F16F 2224/0241; F16F 2226/04; F16F 2234/02; F16F 2238/024; F16F 2238/026
USPC .......................... 267/286, 81, 273; 29/896.9
See application file for complete search history.

(56) References Cited

U.S. PATENT DOCUMENTS

| | | | | |
|---|---|---|---|---|
| 4,544,610 | A * | 10/1985 | Okamoto | C22C 49/00 267/149 |
| 4,836,513 | A | 6/1989 | Kramer et al. | |
| 5,098,493 | A | 3/1992 | Taylor | |
| 5,549,370 | A * | 8/1996 | Folsom | F16F 1/3665 267/149 |
| 6,329,069 | B1 * | 12/2001 | Azizi | B21C 37/042 428/600 |
| 6,944,899 | B2 * | 9/2005 | Gladney | A47C 23/043 267/180 |
| 7,047,581 | B2 * | 5/2006 | Gladney | A47C 23/043 267/180 |
| 7,131,640 | B2 * | 11/2006 | Knowles | B29C 47/0004 188/267 |
| 7,168,117 | B2 * | 1/2007 | Gladney | A47C 23/043 267/180 |
| 8,474,805 | B2 * | 7/2013 | DeFranks | A47C 23/0438 267/148 |
| 8,919,752 | B2 * | 12/2014 | DeFranks | A47C 23/0438 267/148 |
| 2002/0190451 | A1 * | 12/2002 | Sancaktar | B29C 53/12 267/166 |
| 2007/0235913 | A1 * | 10/2007 | Chien | F16F 1/3605 267/149 |
| 2009/0071590 | A1 * | 3/2009 | Chien | F16F 1/3605 156/143 |
| 2014/0035211 | A1 * | 2/2014 | Bailey | F16F 1/06 267/166 |
| 2014/0046502 | A1 * | 2/2014 | Schmitt | B60G 11/00 701/1 |

FOREIGN PATENT DOCUMENTS

| | | |
|---|---|---|
| FR | 2 837 250 A1 | 9/2003 |
| WO | WO 02/099307 A1 | 12/2002 |
| WO | WO 2012/035239 A1 | 3/2012 |

* cited by examiner

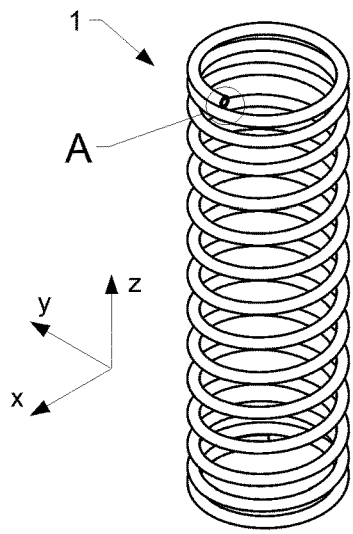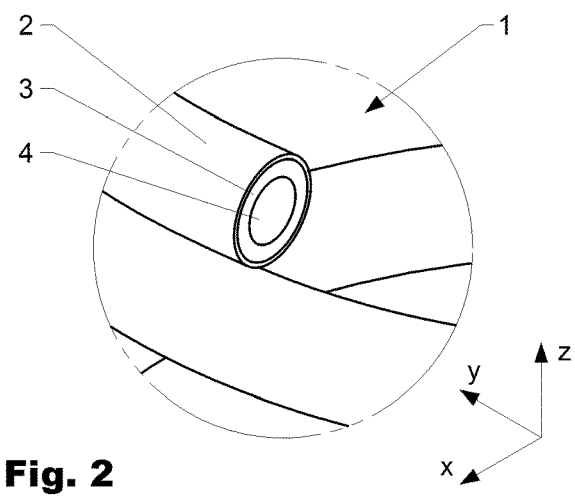
Fig. 1  Fig. 2
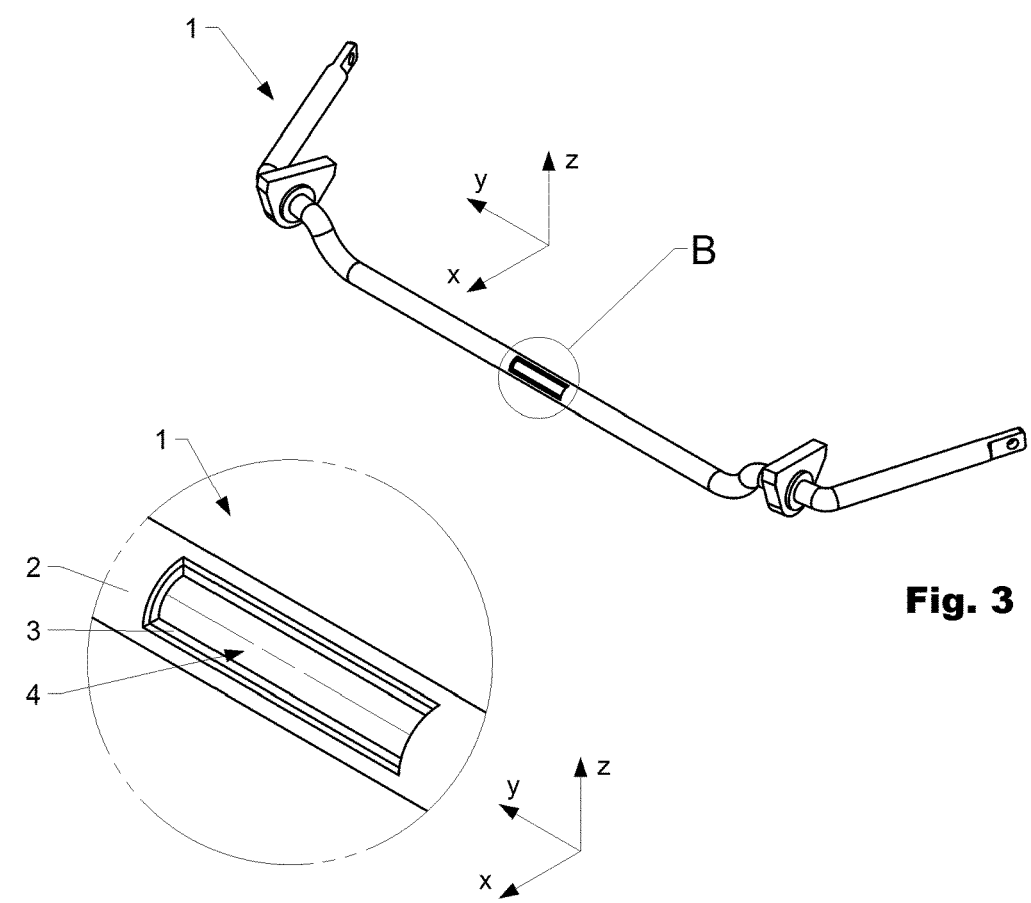
Fig. 3
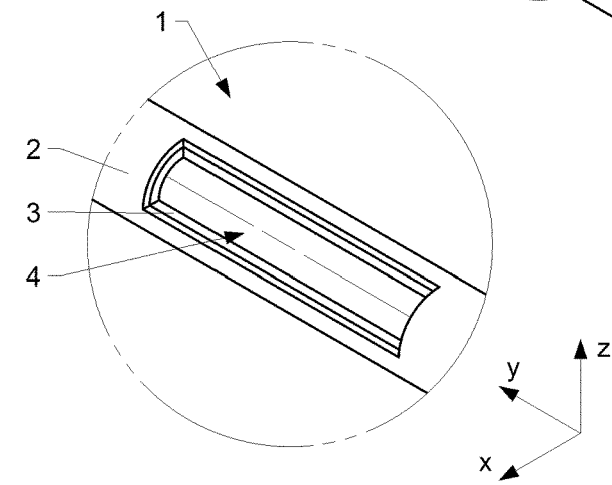
Fig. 4

HYBRID SPRING DEVICE

BACKGROUND OF THE INVENTION

Field of the Invention

The present invention is directed to a hybrid spring device comprising an outer tubular shell and an inner part enclosed in the outer tubular shell comprising a fibre reinforced plastic material which is in particular useful for automotive applications. The invention is further directed to methods for producing a hybrid spring device of this kind.

Discussion of Related Art

Spring devices for automotive applications such as axle springs or torsion bars must show a defined deformation characteristic in an environment where they are exposed to strange chemical and physical impacts.

The spring devices currently used are mainly made from metallic materials. To improve their properties in particular against corrosion they are subjected to various treatments including heat treatments. Surface coatings using epoxy resins are common as well. Though such treatments are effective in protecting the metallic spring devices against corrosion, their deformation characteristic is almost exclusively governed by the properties of the metallic material, this limiting the optimization of the spring characteristics.

The prior art on the other hand teaches spring devices for automotive applications made from fiber reinforced plastic materials.

For example, WO12035239 discloses a suspension spring for a motor vehicle made from a composite material including fibres and resin, wherein the composite material forms the outer layer of the spring. Use of carbon fibres is mentioned.

FR2837250 discloses a helical spring that may be used as an axle spring. The helically wound spring wire has a core part and an outer layer both made of fibre reinforced composite material. The central part is a first wire comprising elongated fibres extending unidirectional along the axis thereof. The outer layer is made of a ribbon or a second wire comprising elongated fibres extending unidirectional along the axis thereof, too. For forming the outer layer the ribbon or second wire is wrapped around the first wire at an angle relative to the axis of the first wire.

WO02099307 discloses a fibre-reinforced composite spring comprising a coiled spring wire that comprises a fibre-reinforced core having a longitudinal axis, where the core comprises core-reinforcing fibre tows that are twisted about the longitudinal axis of the core. An outer layer surrounding the fibre-reinforced core comprises a resin that is devoid of fibre tows.

SUMMARY OF THE INVENTION

One object of the present invention is to provide a hybrid spring device that fits in particular to automotive applications. This object is achieved by a hybrid spring device as defined in claim 1. The hybrid spring device according to the invention is accordingly characterized in that the outer tubular shell is self-supporting and is made from a metallic or another appropriate material.

A hybrid spring device (spring device) according to the present invention in general comprises an outer tubular shell and a core made out of fibre reinforced plastic material. The tubular shell is preferably made out of metal or any other material which is suitable to protect the core made out of fibre reinforced plastic material comprising fibres embedded in and supported by a matrix material. The core made out of fibre reinforced plastic material may consist out of one or several layers of fibre reinforced plastic material. The at least one layer of fibre reinforced plastic material may comprise one or multiple bundles (roving) of multiple reinforcing fibres. Alternatively or in addition the core made out of fibre reinforced plastic material may comprise at least one layer of woven or braided reinforcing fibers. At least one layer may comprise reinforcing fibres arranged as a braided hose. If appropriate it may itself be hollow, i.e. tubular. Normally the outer tubular shell and the core made out of fibre reinforced plastic material are interconnected to each other. Good results are achieved if the outer tubular shell and the fibre reinforced plastic material are bonded to each other. To improve bonding an inner surface of the outer tubular shell may be coated by a coating material.

The outer tubular shell normally is self-supporting. An outer tubular shell being self-supporting means that such shell has a defined shape and can be handled in such shape as an individual part prior to being combined with the inner part.

If required the outer tubular shell may consist out of one or several parts which e.g. may be assembled in longitudinal and/or transversal direction with respect to the length axis of the spring. The assembly may take place before the fibre reinforced plastic material is inserted or after.

Depending on the field of application, the diameter and/or the wall thickness of the inner part and the outer tubular metallic shell can be chosen within certain limits. In combination with the specific materials of the two parts the mechanical strength and the elastic properties such as the spring rate of the inventive device can be finely tuned in view of the specific requirements of the intended application. The outer tubular shell may protect the fibre reinforced plastic material from environmental influences. Compared to products known from the prior art a weight reduction may be achieved. A device made according to the invention altogether may result in an increase of the performance.

The hybrid spring device according to the invention may be further characterized by the following features: The inventive device may be designed as or formed into a compression spring and/or a torsion spring and/or an extension spring and/or a leave spring. In particular for use as torsion rod for automotive chassis a main part of its longitudinal extension may be straight. In particular for use as an axle spring for an automotive chassis a main part of its longitudinal extension may be formed into the shape of a coil spring. Other applications are possible. The metallic material of the outer tubular shell may e.g. be spring steel, aluminum or titanium.

The fibres of the fibre reinforced plastic material may be selected from the group of glass, carbon, basalt and/or aramide fibres. The fibres of the fibre reinforced plastic material may comprise continuous fibres arranged in one or several layers of unilateral direction and/or in the form of a woven fabric.

Different fibres of the woven fabric may be oriented with respect to each other under an angle. For torsional load the majority of the fibres is preferably arranged in an angle of +/−45°. Depending on the field of application the angles may vary. The angles, the setup of the layers, the compounds and the thickness of the fibre reinforced plastic material may vary along the length of the device. The matrix of the fibre reinforced plastic material may be a thermosetting material particularly selected from the group of epoxy resin and/or polyurethane resin. Alternatively or in addition, the matrix material may also be UV-setting material and/or a thermoplastic material. If required the outer surface of the outer tubular shell may be coated with an anti-corrosive material.

Another object of the invention is to provide a method for effectively producing a hybrid spring device according to invention. One method according to the invention is in general comprises the following steps: Providing a tubular metallic shell, such shell being self-supporting and having a first shape. Providing an assembly of fibres, the assembly fibers having a shape that fits into the tubular metallic shell. Inserting the assembly of fibers into the outer tubular shell. Forming the tubular metallic shell into a second shape. Fixing the fibres of the assembly of fibers inside of the tubular metallic shell in a plastic matrix material.

In that the inner fibre reinforced part is fixed inside the outer tubular shell the latter does serve as a tool for forming the inner part. Special forming tools are omitted.

The method for effectively producing a hybrid spring device according to invention may be further characterized in that step assembly of fibres comprises fibers which are pre-impregnated with an uncured thermosetting matrix material. The thermosetting matrix material may be cured by the application of heat and/or light and/or pressure. Heat can be applied e.g. by using a metallic material for the outer shell which comprises a certain electrical and/or inductive resistance such that by applying an electrical current or an inductive field a controlled heating of the outer shell occurs which supports the curing of the matrix material.

If appropriate the assembly of fibers may comprise dry fibres. In this case an uncured thermosetting or light-setting (e.g. UV-setting) matrix material is injected in liquid form into the tubular metallic shell around the reinforcing fibers.

The assembly of fibers may be inserted into the tubular outer shell by using a pull-in aid for inserting the pre-form into the tubular metallic shell. The tubular metallic shell may be formed into the final geometry with the metallic rod inside into the shape of a coil spring; and unscrewing the metal rod from the tubular metallic shell.

According to the invention, the fibres may also be positioned by fixing them, e.g. temporarily or permanently, in a first step on a flexible hose- or balloon-like structure. The fibres may have a varying orientation and/or thickness and/or density and/or amount of layers over the length of the hose- or balloon-like structure. The fibres then are inserted into the tubular shell until they have reached a certain position. The space between the hose- or balloon-like structure and the outer shell i o then may be filled with a matrix material e.g. by applying pressure and/or depression. If required a fluid may be inserted into the hose-of balloon-like structure to exert a certain pressure against the inside of the fibres while the plastic material is introduced and/or afterwards. According to the invention the pressure and depression may be varying during said process.

BRIEF DESCRIPTION OF THE DRAWINGS

The herein described invention will be more fully understood from the detailed description given herein below and the accompanying drawings which should not be considered limiting to the invention described in the appended claims. The drawings are showing:

FIG. 1 is a hybrid spring device according to the invention in the shape of a helical axle spring in a perspective view;

FIG. 2 is detail A of FIG. 1;

FIG. 3 shows another hybrid spring device according to the invention shape of a torsion rod;

FIG. 4 is detail B of FIG. 3;

DETAILED DESCRIPTION OF THE INVENTION

In the FIG. 1 generally designates a hybrid spring device. In FIG. 1 the hybrid spring device 1 is formed in the shape of a helically coiled compression spring as this is common for automotive axle springs. FIG. 2 shows detail A of FIG. 1 in a magnified manner.

In FIG. 3, the hybrid spring device 1 is in the shape of a torsion rod (stabilizer) of a automotive torsion spring axle. As it can be seen in the shown example, a main part of the longitudinal extension of may be straight. FIG. 4 shows detail B of FIG. 3 in a magnified manner.

The two shown shapes are just exemplary, i.e. various other shapes are possible. For example, the axle spring of FIG. 1 may be provided with a non-cylindrical shape with the windings having a varying diameter. As well, the pitch of the windings may vary.

As regards the torsion rod 1 according to FIG. 3, the shape thereof usually depends on the specific construction of the automotive chassis in which it is being used. The cross section of the outer tubular shell need not to be circular but may be elliptical for example in particular close to the ends thereof.

FIG. 2 shows detail A of FIG. 1 in a magnified manner. As it can be seen the end of the herein helically shaped hybrid spring device 1 has an outer tubular shell 2. A similar situation can be seen in FIG. 4 which shows detail B of FIG. 3.

Also here the hybrid spring device 1 comprises an outer tubular shell 2 and on the inside a inner part 3 made at least partially made out of a fibre reinforced material. If required the inside can be filled by an appropriate sealing material.

Figure 5:
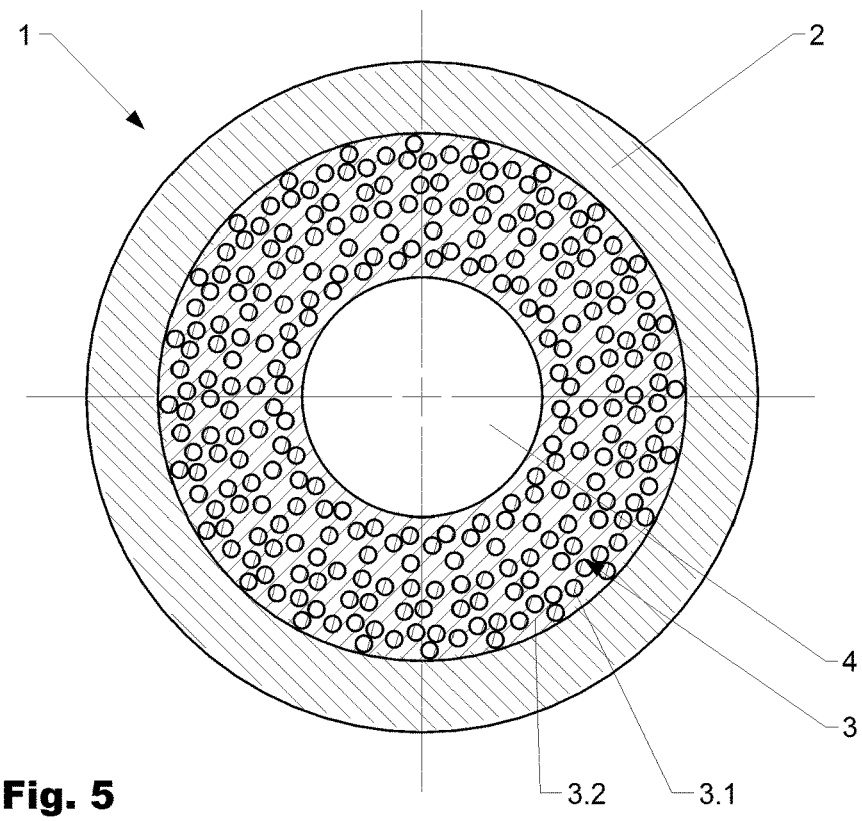
FIG. 5 schematically shows a cross section of the hybrid spring devices of FIG. 1 or 3 according to a first embodiment.

In FIG. 5 shows an exemplary cross section of the hybrid spring devices 1 as shown in FIG. 1 or 3. The cross-section of the hybrid spring device 1 consists out of several layers having an outer tubular shell 2, which in the shown embodiment is made out of a metallic material. The tubular shell 2 preferably is self-supporting, meaning that even taken as an individual part it has a defined shape and can be handled in this shape. An inner part 3 is enclosed in the outer tubular shell 2 made from a fibre reinforced plastic material. One of the fibres is designated by 3.1 and plastic material by 3.2. The plastic material 3.2 forms a matrix in which the fibres 3.1 are embedded. In the embodiment of FIG. 5 the inner part 3 is tubular too leaving a void 4 in the centre thereof. When making of the part it is possible to use the void 4 to press the fibres against the outer tubular shell 2. e.g one or several layers of fibers are arranged on and, if required, temporarily fixed to a flexible hose (not shown in detail). The fibers 3.1 are then introduced with the aid of the hose into the outer tubular shell 2 until they have reached a certain position inside of the outer tubular shell. It must be understood that the fibers can have a varying orientation and/or thickness and/or density and/or amount of layers over the length of the hose, respectively in a mounted position over the length of the outer tubular shell.

If the fibers are applied in dry manner, i.e. without matrix material, a plastic material 3.2 is introduced between the hose and the outer tubular shell 2 by applying pressure and/or depression. If required a fluid can be inserted into the hose to exert a certain pressure against the inside of the fibers while the plastic material is introduced and/or after. If appropriate the pressure and/or depression are varied during said process.

Figure 6:
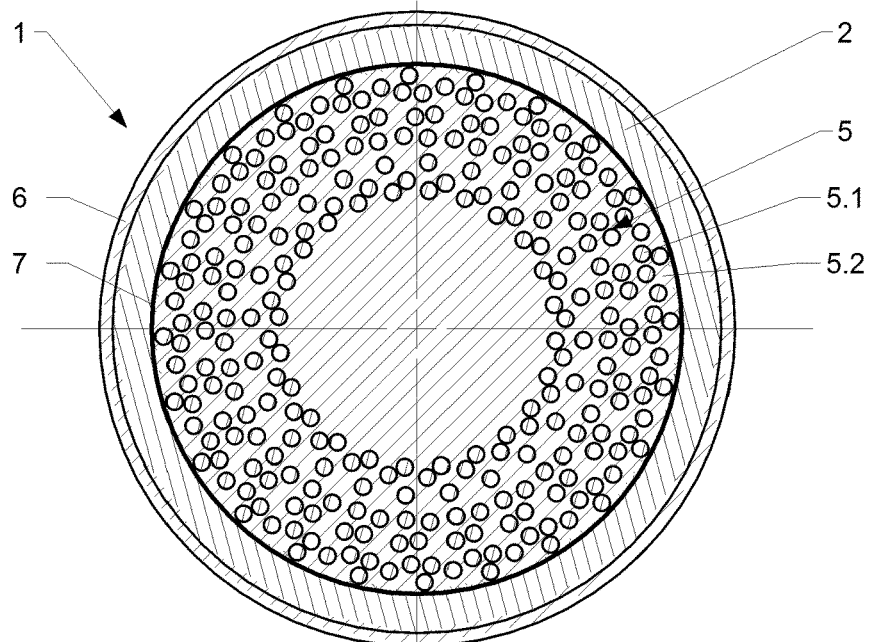
FIG. 6 schematically shows a cross section of the hybrid spring devices of FIG. 1 or 3 according to a second embodiment.

In FIG. 6, showing a cross section of the hybrid spring devices of FIG. 1 or 3 according to the second embodiment, the inner part 5 is solid. The reinforcing fibres 5.1 are nevertheless only present in an outer section forming a tubular part, whereas the plastic material 5.2 completely fills out the space inside the outer tubular shell 2. However, in some embodiments instead of forming a tubular part the reinforcing fibres 5.1 may also be present in the central inner part.

In the embodiment of FIG. 6 there is further provided an additional first layer 6 at the outside surface of the outer tubular shell 2 e.g. in the form of an anti-corrosive coating. A second layer 7 is provided at the inside surface of the outer tubular shell 2 which e.g. can be a coating too. By means of such layer 7 a bond or a stronger bond between the plastic matrix material 5.2 and the inner surface of the outer tubular shell 2 can be achieved for rotationally fixing the inner part 5 to the outer tubular shell 2.

In the embodiment of FIG. 5 similar first and/or second layers 6, 7 or like the layers may be provided as well. In FIG. 5 the void 4 may also be filled with some material identical or different from the matrix forming material 3.2.

The cross sections as shown in FIG. 5 or 6 or other suitable cross sections may not necessarily extend over the complete longitudinal extension of the herein described device. In particular close to the ends thereof fibers may not be required in any case for special reinforcement. Also, instead of the plastic matrix material, the outer tubular shell may be filled with some other material in these regions such as low melting metal alloy.

Depending on the field of application a hybrid spring device according to the invention may generally have an outer diameter d in the range of 5 mm to 1 00 mm.

Rather, the words used in the specification are words of description rather than limitation, and it is understood that various changes may be made without de-parting from the Spirit and scope of the invention.

The invention claimed is:

1. A hybrid spring device comprising:
   a. an outer tubular shell, and
   b. an inner part enclosed in the outer tubular shell comprising a fibre reinforced plastic material having several layers, wherein each of the several layers of the fibre reinforced plastic material is tubular about a central area having no fibres, and wherein
   c. the outer tubular shell is self-supporting and is made from a metallic material.

2. The hybrid spring device according to claim 1, comprising a torsion spring and/or a compression spring and/or an extension spring.

3. The hybrid spring device according to claim 1, wherein a main part of a longitudinal extension of the hybrid spring device is straight.

4. The hybrid spring device according to claim 1, wherein a main part of a longitudinal extension of the hybrid spring device is formed into the shape of a coil spring.

5. The hybrid spring device according to claim 1, wherein the metallic material of the outer tubular shell is spring steel, aluminum or titanium.

6. The hybrid spring device according to claim 1, wherein the fibres of the fibre reinforced plastic material are selected from the group of glass and/or carbon and/or basalt and/or aramid fibres.

7. The hybrid spring device according to claim 1, wherein the fibres of the reinforced plastic material comprise continuous fibres arranged in the form of rovings and/or a woven fabric and/or a braided fabric.

8. The hybrid spring device according to claim 7, wherein different fibres of the woven fabric are oriented with respect to each other under an angle, the angle being in the range of +45° to −45°.

9. The hybrid spring device according to claim 1, wherein the plastic material of the fibre reinforced plastic material is a thermosetting material particularly selected from the group of epoxy resin and/or polyurethane resin and/or a UV-setting material or a thermoplastic resin.

10. The hybrid spring device according to claim 1, wherein the outer surface of the outer tubular shell is coated with an anti-corrosive material.

11. The hybrid spring device according to claim 1, wherein the inner part comprises the fibre reinforced plastic material with more than one layer of fibres arranged in bundles.

12. The hybrid spring device according to claim 1, wherein the several layer of the fibres are arranged in repetitive patterns in a circumferential direction.

13. The hybrid spring device according to claim 1, wherein the central area comprises a void.

14. The hybrid spring device according to claim 13, wherein the void is filed with a plastic material without reinforcing fibres.

15. A hybrid spring device comprising:
   a. an outer tubular shell, and
   b. an inner part enclosed in the outer tubular shell comprising a fibre reinforced plastic material having at least one layer, wherein the at least one layer of the fibre reinforced plastic material surrounds a void in the centre of the hybrid spring device and wherein
   c. the outer tubular shell is self-supporting and is made from a metallic material.

16. The hybrid spring device according to claim 15, wherein the void is filed with a plastic material without reinforcing fibres.

* * * * *